UNITED STATES PATENT OFFICE.

TOBIAS NEW, OF BROOKLYN, NEW YORK.

METHOD OF PREPARING STRAW TO BE CONVERTED INTO PAPER-STOCK, &c.

SPECIFICATION forming part of Letters Patent No. 290,912, dated December 25, 1883.

Application filed November 26, 1883. (No specimens.)

*To all whom it may concern:*

Be it known that I, TOBIAS NEW, of the city of Brooklyn, county of Kings, and State of New York, have invented a new and Improved Method of Preparing Stock to be Converted into Paper-Pulp; and I hereby declare the following to be a full, clear, and exact description of the same, sufficient to enable those skilled in the art to practice my invention.

My improved method contemplates the utilization of the waste straw and similar materials us d for bedding animals; and it consists in the method, hereinafter specifically described, and pointed out in the claim, for treating such waste material preparatory to conversion into paper-pulp.

The straw or similar material used for bedding for animals I allow to remain on the floor of the stall or other place where animals are bedded until it is trampled upon so as to be crushed or broken and wetted with the urine evacuated by the animals. Meanwhile it becomes mixed with the defecations or manure of the animals, and the manure and straw are removed *en masse* in this mixed condition and piled in any convenient locality in such quantities as to produce a sweating of the mass or a fermenting action. After the sweating is completed, it will be found that the straw is in a great degree disintegrated and the silex in a measure removed. The broken or crushed and sweated straw is separated from the mixture of manure and straw, and is treated to make paper-pulp in any desired manner.

I have demonstrated by actual experiment that the waste or shrinkage of the straw prepared as hereinbefore described is less than when new, fresh straw is used to make the pulp. In other words, one ton of straw treated by my improved method will make quite a percentage more paper-pulp and a handsomer article than can be produced directly from a ton of new straw treated by the present known mechanical and chemical means. After the straw is treated by my method, it requires less time and labor to fit it for the pulping-engine than is required for new, fresh straw, and less chemicals need be used; consequently I reduce the cost of the manufacture in addition to utilizing the waste product of the stable and barnyard.

I am aware that heretofore the undigested fiber has been removed from animal dung or manure and utilized in making paper-pulp.

I am also aware that waste straw and like materials have been removed from animal-manure, been washed, and treated to form paper-pulp; but I am not aware that heretofore waste straw and similar material have been subjected to a sweating or fermenting action when mingled with animal-manure, after trampling or crushing and wetting with urine, and then treated to form paper-pulp; hence

What I claim as new, and desire to secure by Letters Patent, is—

The improved method described for preparing straw and similar material for making paper-pulp, consisting, essentially, in trampling or breaking the straw, wetting it with urine, piling it mingled with animal-manure until it is sweated or fermented, and then separating it from the manure, for the purpose set forth.

TOBIAS NEW.

Witnesses:
   EDWIN E. DICKINSON,
   CLARENCE H. NEW.